United States Patent [19]

Perego

[11] Patent Number: 5,305,651
[45] Date of Patent: Apr. 26, 1994

[54] MECHANICAL TRANSMISSION FOR TOY AUTOMOBILES

[75] Inventor: Gianluca Perego, Arcore, Italy
[73] Assignee: Peg Perego Pines, S.p.A., Milan, Italy
[21] Appl. No.: 112,258
[22] Filed: Aug. 26, 1993

Related U.S. Application Data

[63] Continuation of Ser. No. 916,953, Jul. 20, 1992, abandoned.

[30] Foreign Application Priority Data

Jul. 22, 1991 [IT] Italy ............. MI 91 A 002017

[51] Int. Cl.⁵ ............................................. F16H 3/08
[52] U.S. Cl. ........................................ 74/372; 74/371; 192/48.91; 192/96
[58] Field of Search ............... 74/425, 369, 371, 372; 192/48.91, 71, 96

[56] References Cited

U.S. PATENT DOCUMENTS

| | | | |
|---|---|---|---|
| 596,695 | 1/1898 | Corliss | 74/372 |
| 1,371,187 | 3/1921 | Pulliam | 74/372 |
| 2,047,174 | 7/1936 | Baumgartner | 74/372 |
| 2,377,575 | 6/1945 | Ringer | 192/96 |
| 2,937,539 | 5/1960 | Mueller | 192/96 |
| 3,890,850 | 6/1975 | Hauser et al. | 74/372 |
| 4,141,424 | 2/1979 | Murayama et al. | 74/372 X |
| 4,702,119 | 10/1987 | Edwards | 74/371 |
| 5,099,713 | 3/1992 | Edwards | 74/371 |

FOREIGN PATENT DOCUMENTS

| | | |
|---|---|---|
| 137002 | 8/1979 | Fed. Rep. of Germany . |
| 1479471 | 5/1967 | France . |
| 2596127 | 9/1987 | France . |
| 929261 | 6/1963 | United Kingdom . |

*Primary Examiner*—Leslie A. Braun
*Assistant Examiner*—Khoi Q. Ta
*Attorney, Agent, or Firm*—McGlew and Tuttle

[57] ABSTRACT

A mechanical transmission (10) in particular for toy automobiles includes a substantially cylindrical element (19) rotating axially in kinematic connection with the motion output (22) of the transmission. On the cylindrical element (19) there are fitted in a rotating manner toothed gears (17, 18) each of which is in kinematic connection at a different ratio with the motion input of the transmission. Inside the cylindrical element (19) a cursor (24) is axially sliding between the gears (17, 18) for selective sequential radial engagement between the cylindrical element (19) and the gears (17, 18) so as to realize motion transmission with a different ratio between input and output through selection of engagement between the cylindrical element and a gear.

8 Claims, 2 Drawing Sheets

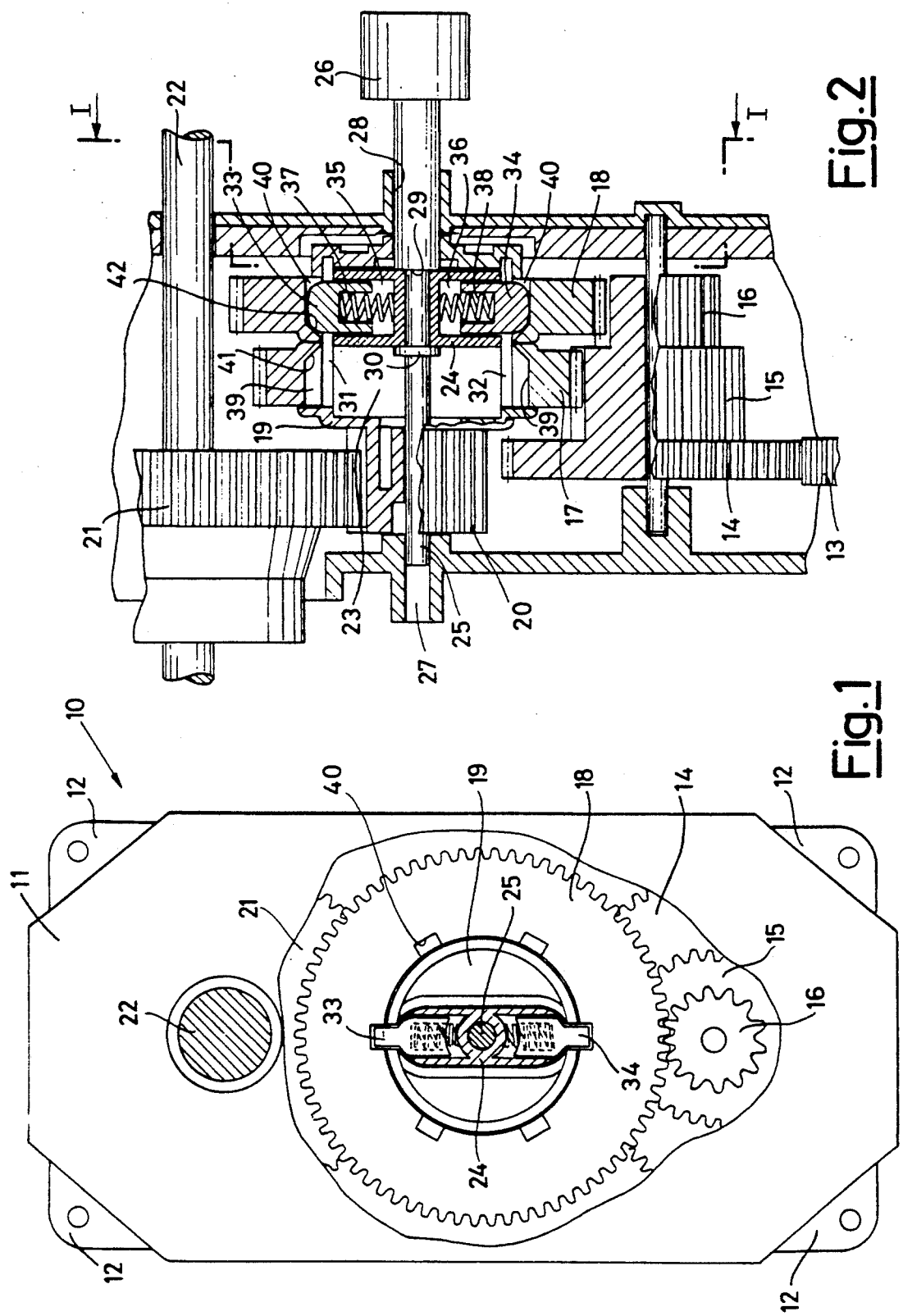

MECHANICAL TRANSMISSION FOR TOY AUTOMOBILES

This is a continuation of application Ser. No. 07/916,953 filed Jul. 20, 1992 now abandoned.

FIELD AND BACKGROUND OF THE INVENTION

Background of the Invention

The present invention relates to an innovative mechanical transmission for toy electric cars for children. In the known art toy electric cars for children are usually equipped with 2-speed transmissions realized by an electric switch which connects the motor to the entire battery package or to a single part thereof so that it is powered at full voltage, which corresponds to the high gear, or reduced voltage, e.g. half, corresponding to low gear. This solution has however the disadvantage that at the lower gear there is a corresponding lesser power delivered to the motor, which is exactly opposite to what is normally desired from a transmission. In addition, during design it is not possible to determine freely the speed ratio between the two speeds since it is dependence on the electrical parameters of the motor, even allowing for the fact than below a certain input voltage the motor would tend to stop at the slightest additional effort. On the other hand known mechanical transmissions are considered excessively complicated and costly for use in a toy automobile because they assume the existence of a disengageable clutch with pedal for changeover between the various speeds, which would complicate control of the toy car by the child.

A draw-key type transmission which includes a plurality of gears rotatably mounted on a transmission shaft with key means movable longitudinally along the shaft to engage between the shaft and a selected gear of the plurality is also known from the prior art. The known transmissions are however, achieved so that they transmit relatively high torques and turn out to be encumbering and expensive for being applied on toy vehicles. For example, U.S. Pat. No. 3,890,850 discloses a transmission for vehicles such as riding lawn mowers. The transmission is made up with many and complex parts and comprises a rotatably-mounted-shaft. An output gear is keyed on an end of the shaft. On the shaft two sleeves are inserted. Gears are freely rotatably mounted on the sleeves and mesh with corresponding input gears. Engageable means sliding in the sleeves by a shifter fork which is pivoted by a shift lever. In this manner, the engageable means engages between the shaft and a selected gears on the sleeves. U.S. Pat. No. 5,099,713 discloses a transmission for tractors, which comprises a hollow shaft supported b bearings. Gears are freely rotatably mounted on the shaft and mesh with corresponding input gears. The shaft accommodates an axially slidable rod which, when moved, forces the pins radially to couple the shaft to the corresponding input gear. The achieved transmission is however highly encumbering, complex and expensive to be applied on toys.

SUMMARY AND OBJECTS OF THE INVENTION

The general purpose of the present invention is to obviate the above mentioned shortcomings by furnishing a mechanical transmission for toy electric cars which would be easy and economical to realize and in addition would not require clutch devices for changing speeds. In view of said purpose it has been sought to realize, in accordance with the present invention, a mechanical transmission, in particular for toy automobiles, of the type having gears to selectively realize control of the means of bringing about kinematic connections with different transmission ratios between a motion input and a motion output of the transmission and characterized in that it comprises a substantially cylindrical element rotating axially in kinematic connection with the motion output of the transmission, there being fitted in a rotating manner on said cylindrical element toothed gears each in kinematic connection at a different ratio with the transmission motion input, there being inside the cylindrical element, sliding axially between the gears, by use of said control means, a cursor for selective sequential radial engagement between the cylindrical element and gears in such a manner as to realize motion transmission with a different ratio between input and output through selection of engagement between the cylindrical element and a gear.

BRIEF DESCRIPTION OF THE DRAWINGS

To further clarify the explanation of the innovative principles of the present invention and its advantages as compared with the known art there are described below with the aid of the annexed drawings possible embodiments as nonlimiting examples applying said principles. In the drawings:

FIG. 1 shows a schematic front view partially sectioned along plane of cut I—I of FIG. 2 of a transmission in accordance with the present invention, FIG. 2 shows a partially cross sectioned side view of the transmission of FIG. 1 in a first operating position.

DETAILED DESCRIPTION OF THE PREFERRED EMBODIMENT

Figure 3:
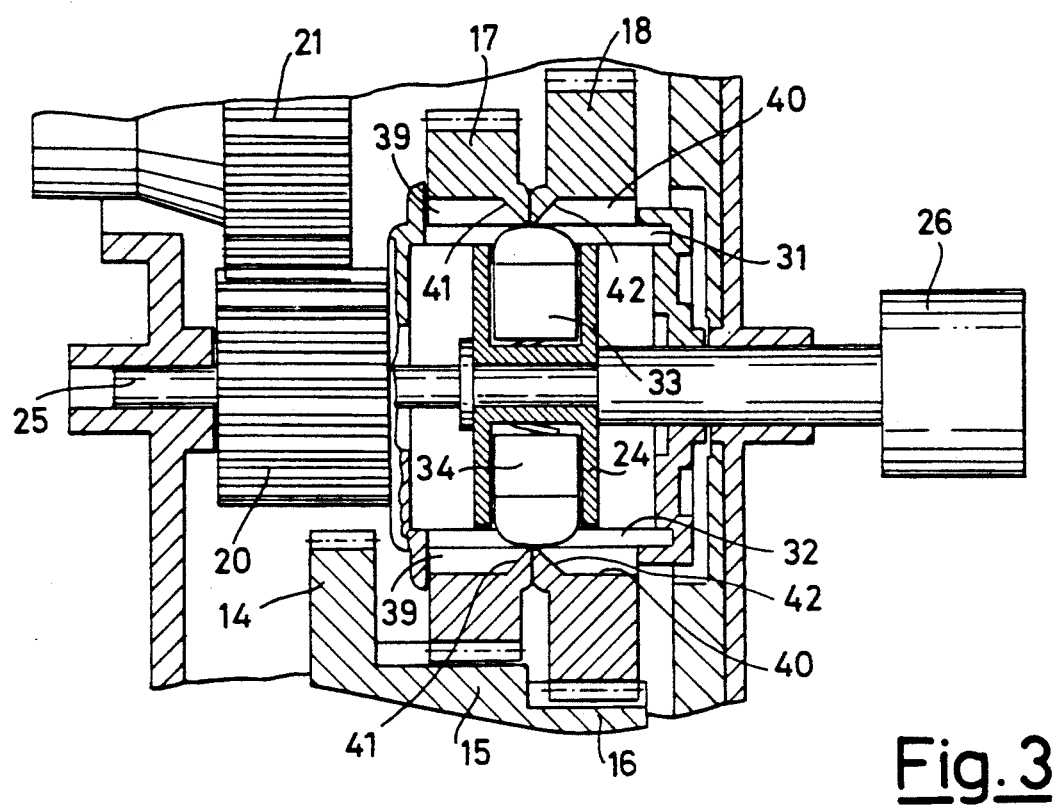
FIG. 3 shows an enlarged partial view of the transmission of FIG. 2 in a second operating position.

With reference to the figures a transmission in accordance with the present invention, indicated generally by reference number 10, comprises, as may well be seen in FIG. 1, a case 11 with fixing tabs 12 and containing the operational mechanisms.

As may well be seen in FIG. 2, a gear 13 connected to an electric motor (not shown) transmits motion to an input gear 14 integral and coaxial with first gears 15 and 16. The gears 15 and 16 are in turn connected to ring gears 17 and 18 respectively.

The gears 17 and 18 have a central hole to be received in a rotating manner on a cylindrical element 19 bearing integrally a gear 20 meshed with an output gear 21 keyed on an output shaft 22 transmitting motion to the wheels (not shown) for example keyed directly thereon.

As may be seen as well in FIG. 1, in the cylindrical element 19 there is radially present an elongated seat 23 receiving in an axially sliding direction a cursor 24 placed on a control shaft 25 with external control end 26. The shaft 25 is supported in a sliding manner in seats 27 and 28 on the container 11 and constitutes also a pivot for the gear 20.

The cursor 24 slides integrally with the pin 25 thanks to lateral ledges 29 and 30 on said pin. The seat 23 of the cylindrical element 19 has along opposite generating lines grooves 31 and 32 from which project elastically, thrust by corresponding springs 37 and 38, sliding keys 33 and 34 received in radial seats 35 and 36 of the cursor 24.

The gears 17 and 18 have in their internal surface, as may well be seen in FIG. 1 for the gear 18, a plurality of radial seats 39 and 40 for selective engagement for the sliding keys 33 and 34 as is clarified below. The radial seats 39 and 40 terminate on the lateral mutually facing faces of the gears 17 and 18 with inclined planes 41, 42.

In use, the transmission 10 receives motion from the gear 13 to the gear 14 so that the gears 15 and 16 transmit said motion to the gears 17 and 18 respectively. In the case illustrated in FIG. 2, the gear 17 is free to rotate around the element 19 while the gear 18 has the radial seats 40 engaged by the projecting ends of the keys 33 and 34 and this makes integral therewith the gear 20 which in turn rotates the gear 21 which transmits movement to the output shaft 22.

Transmission between the motion input and output, i.e. between the gear 14 and the shaft 22, thus takes place with a first ratio.

If the control end 26 of the pin 25 is moved toward the gear box the cursor 24 is moved inside the seat in the element 19 and the keys 33 and 34 run on the inclined parts of the cavities 40 so as to move to a first retracted position of FIG. 3 with the end rested on the internal circumferential edge of the gears 17 and 18. In this position the gears 17 and 18 rotate freely around the element 19 and hence no motion is transmitted to the gear 20 and consequently to the output shaft 22. The position of FIG. 3 is thus to be considered a neutral position.

Figure 4:
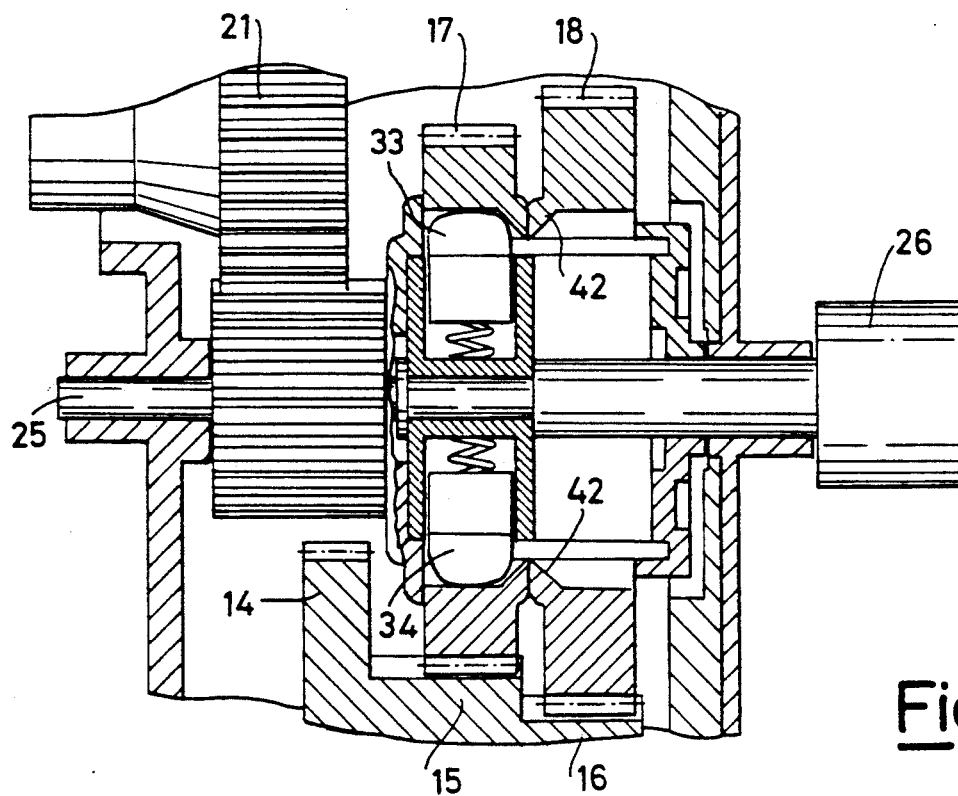
FIG. 4 shows a view of the transmission as in FIG. 3 but in a third operating position.

As the pin 25 continues to slide the cursor moves into the position of FIG. 4 in which the keys engage in seats 39 of the gear 17. In this position the gear 17 is thus made integral with the gear 20 and the movement of the gear 13 is transmitted to the output shaft 22 with a second reduction ratio.

The changes between the first reduction ratio, neutral and the second reduction ratio can of coarse be performed in reverse by pulling outward the control end 26 of the pin 25.

In this case the keys 33 and 34 run on the inclined surfaces 41 so as to move from the position of FIG. 4 to the position of FIG. 3 and thence to the position of FIG. 1. It is at this point clear that the intended purposes have been achieved. A transmission in accordance with the present invention is easy to build, consisting of few readily assembled parts. In addition, no clutch is required for changing between the speeds thanks to the neutral position intermediate between them. Operation is therefore simplified.

Naturally the above description of an embodiment applying the innovative principles of the present invention is given merely by way of example and therefore is not to be taken as a limitation of the patent right claimed here. For example, as is readily imaginable to those skilled in the art, the number of speeds can be different from two by merely providing more gears 15 coaxial with the gear 14 and corresponding gears fitted en the element 19. Gears can also be changed by direct action on the end 26 even though linkages connected between a manual control lever and the end 26 so that the transmission 10 can be installed hidden for example near the drive wheels. Said control lever can also have references for safe positioning of the transmission in neutral and in the various ratios selected in sequence.

The form of the transmission case and the mutual arrangement of the gears as well as the number of their teeth can be varied to obtain appropriate reduction ratios. For example, motion input to the transmission can also be provided by a supporting shaft for the gears 15 and 16, eliminating therefore the gear 14.

I claim:

1. A mechanical transmission particularly for toy automobiles, comprising:
   a transmission housing;
   a pin supported by said housing at a housing first seat and a housing second seat for axially sliding said pin relative to said housing;
   a substantially cylindrical element supported in said housing by said pin for rotation about a central axis of said pin;
   transmission motion output means in kinematic connection with said substantially cylindrical element;
   transmission motion input means including a first plurality of toothed gears supported by said housing, said gears being connected to a motion input for input of transmission motion;
   a second plurality of toothed rotatably gears fitted on said cylindrical element, each of said second plurality toothed gears being in kinematic connection with one of said first plurality of toothed gears at a different gear ratio with said transmission motion input means;
   a connection cursor positioned in a cavity formed inside said cylindrical element, said connection cursor being axially slidable and non-rotatable with respect to said cylindrical element, said cursor being connected to said pin in an axially integral manner, whereby the pin is both a supporting shaft for free rotation of the substantially cylindrical element about said central axis and a reciprocating element for axial sliding of the connection cursor, whereby upon axial sliding movement of said pin, said cursor slides axially in said cavity to radially engage one of said second plurality of toothed gears rotating on said cylindrical element whereby said one of said second plurality toothed gears is connected to said motion output means via said cylindrical element.

2. Transmission in accordance with claim 1 wherein said cursor comprises radially sliding keys thrust outward by springs to radially engage said cylindrical element through peripheral openings of said cylindrical element selectively in corresponding seats arranged on the internal surface of a selected one of said gears.

3. Transmission in accordance with claim 2 wherein each of said seats have ends on the mutually facing sides of the gears with inclined planes for thrust of said keys toward an interior of said cursor allowing movement outside said seats against the action of said springs to slide said cursor between one gear and another, to an intermediate position between side-by-side gears constituting a neutral position of the transmission.

4. Transmission in accordance with claim 2 wherein said peripheral openings are slots arranged along generating lines of said cylindrical element for guided sliding of said keys upon axial movement of said cursor.

5. Transmission in accordance with claim 1 wherein a control end is connected to said cursor outside of said housing for movement of the cursor in sequence between the gears.

6. Transmission in accordance with claim 1 wherein kinematic connection between the cylindrical element and the motion output comprises a first gear axially integral with the cylindrical element and meshing with a second gear keyed on the motion output means.

7. Transmission in accordance with claim 1 wherein the kinematic connections between said toothed gears and said transmission motion input means comprise gears of different diameters integral axially and mutually and each meshing with a corresponding gear of said toothed gears to realize a different transmission ratio, said axially and mutually integral gears being connected kinematically to said transmission motion input means.

8. A mechanical transmission particularly for toy automobiles, comprising:
- a transmission housing with housing walls defining a housing first seat and a housing second seat;
- a pin supported by said housing at said housing first seat and said housing second seat for axially sliding said pin relative to said housing and for rotation about a central axis, said pin having a pin control end for moving said pin axially;
- a substantially cylindrical element supported in said housing by said pin for rotation about a central axis of said pin, said cylindrical element having a gear connected thereto and formed integrally therewith;
- transmission motion output means in kinematic connection with said gear of said substantially cylindrical element;
- transmission motion input means including a first plurality of toothed gears supported in said housing, said gears being connected to an input gear for input of transmission motion;
- a second plurality of toothed gears rotatably fitted on said cylindrical element, each of said second plurality of toothed gears being in kinematic connection with one of said first plurality of toothed gears at a different gear ratio with said transmission motion input means;
- a connection cursor positioned in a cavity formed inside said cylindrical element, said connection cursor being connected to said cylindrical element inside said cavity to be axially slidable and non-rotatable with respect to said cylindrical element, said cursor being connected to said pin in an axially integral manner, said pin acting as both a supporting shaft for free rotation of the substantially cylindrical element about said central axis and a reciprocating element for axial sliding of the connection cursor, whereby upon axial sliding movement of said pin, said cursor slides axially in said cavity to radially engage one of said second plurality of toothed gears rotating on said cylindrical element whereby said one of said second plurality toothed gears is connected to said motion output means via said cylindrical element.

* * * * *